(12) United States Patent
Trabelsi et al.

(10) Patent No.: US 7,286,505 B2
(45) Date of Patent: Oct. 23, 2007

(54) METHOD AND SYSTEM FOR CHANNEL ELEMENT ALLOCATION FOR WIRELESS SYSTEMS

(75) Inventors: Chokri Trabelsi, Bridgewater, NJ (US); George F. Elmasry, North Attelebor, MA (US); Huaping Liu, Corvallis, OR (US)

(73) Assignee: Lucent Technologies Inc., Murray Hill, NJ (US)

( * ) Notice: Subject to any disclaimer, the term of this patent is extended or adjusted under 35 U.S.C. 154(b) by 1094 days.

(21) Appl. No.: 10/419,650

(22) Filed: Apr. 21, 2003

(65) Prior Publication Data

US 2004/0208166 A1    Oct. 21, 2004

(51) Int. Cl.
*H04Q 7/00* (2006.01)
*H04Q 7/20* (2006.01)

(52) U.S. Cl. .................... 370/329; 370/468; 370/477; 370/437; 455/453

(58) Field of Classification Search ............... 370/329, 370/468, 477, 437, 235; 455/450, 451, 452.1, 455/452.2, 453
See application file for complete search history.

(56) References Cited

U.S. PATENT DOCUMENTS 6,400,966 B1 *   6/2002   Andersson et al. ......... 455/561
6,621,803 B2 *   9/2003   Halton et al. ............... 370/329

* cited by examiner

*Primary Examiner*—Ricky Q. Ngo
*Assistant Examiner*—Kibrom T Hailu

(57) ABSTRACT

This relates to a method and system for channel element allocation for wireless systems. More particularly, the method and system are directed to channel element allocation based on voice call equivalence, bit load, and call quantum weight for multimedia wireless systems (e.g. 3g UMTS systems).

18 Claims, 8 Drawing Sheets

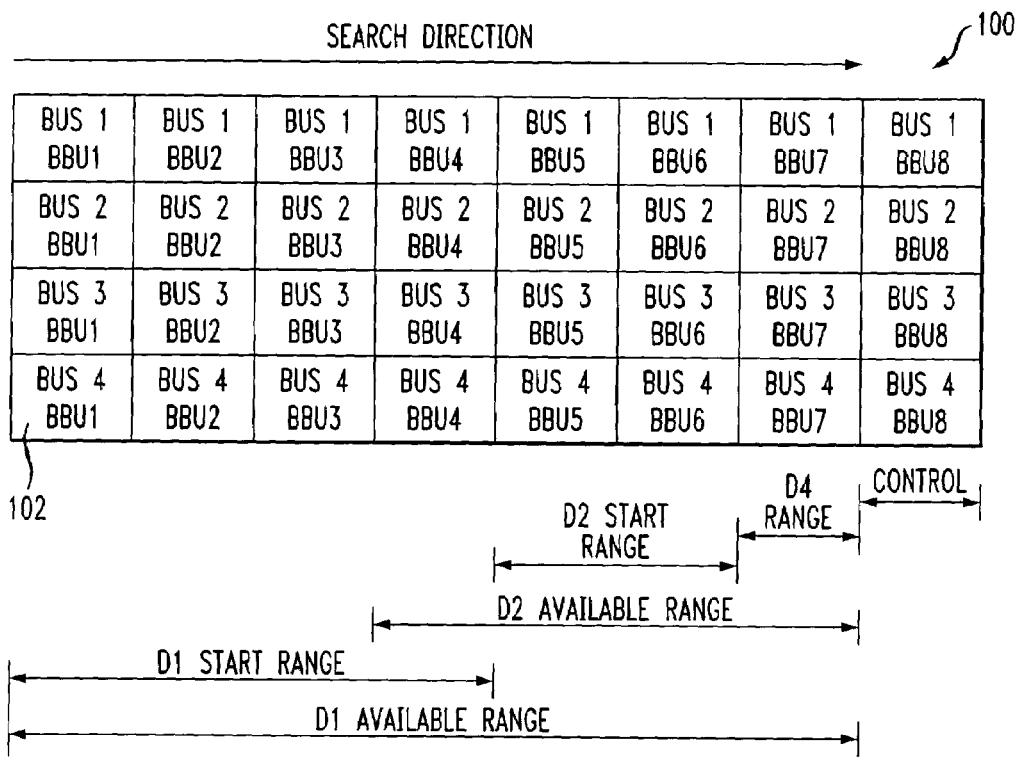

FIG. 4

| | VOICE-CALL EQUIVALENCE |
|---|---|
| D1 | |
| D2 | |
| ⋮ | |
| DN | |

FIG. 5

| | BIT LOAD |
|---|---|
| D1 | |
| D2 | |
| ⋮ | |
| DN | |

FIG. 6

| | CALL QUANTUM |
|---|---|
| D1 | |
| D2 | |
| ⋮ | |
| DN | |

FIG. 7

| | AVAILABLE RESOURCES |
|---|---|
| D1 | |
| D2 | |
| ⋮ | |
| DN | |

| D1 | THRESHOLD | D2 | THRESHOLD | ⋯ | THRESHOLD | DN | THRESHOLD |
|---|---|---|---|---|---|---|---|
| D1 | | D1 | | D1 | | D1 | |
| D2 | | D2 | | D2 | | D2 | |
| ⋮ | | ⋮ | | ⋮ | | ⋮ | |
| DN | | DN | | DN | | DN | |

(802, 800)

METHOD AND SYSTEM FOR CHANNEL ELEMENT ALLOCATION FOR WIRELESS SYSTEMS

BACKGROUND OF THE INVENTION

This invention relates to a method and system for channel element allocation for wireless systems. More particularly, the invention is directed to channel element allocation based on voice call equivalence, bit load, and call quantum weight for multimedia wireless systems (e.g. 3G UMTS systems). The system allows for improved load balance on the buses that are implemented in wireless network components.

While the invention is particularly directed to the art of channel element allocation in a wireless network environment, and will be thus described with specific reference thereto, it will be appreciated that the invention may have usefulness in other fields and applications. For example, the invention may be used in a variety of environments involving resource allocation based on data types and traffic loads.

By way of background, for third generation, or 3G, cellular systems (e.g. UMTS), the base transceiver station (BTS), or NodeB, carries different types of data in addition to voice calls. This raises the need and desire to have resource allocation algorithms that manage the BTS resources in an efficient manner to accommodate these different types of data.

Notably, although the configuration may vary, a BTS typically has internal buses connected to groups of baseband units (BBUs). Each BBU is also associated with a number of channel elements for call processing. The BTS communicates with corresponding a Radio Network Controller (RNC) which then communicates with a data network or a circuit switched network. The BTS also communicates with a wireless user through an air interface.

Currently, if one of the internal data buses is excessively loaded, delays on that bus will increase in frequency and duration. Of course, this impacts the quality of service. Moreover, calls may be undesirably rejected simply because the resources of the NodeB, or BTS, are not properly allocated.

The present invention contemplates a new and improved method and system for channel element allocation that resolves the above-referenced difficulties and others.

SUMMARY OF THE INVENTION

A method and system for channel element allocation for wireless systems are provided.

In one aspect of the invention, the method comprises generating a map having mapping elements organized in rows corresponding to the buses and columns corresponding to the baseband units, allocating a first set of mapping elements to voice traffic, allocating a second set of mapping elements to a first type of data traffic, allocating a third set of mapping elements to a second type of data traffic, processing the voice traffic, first type of data traffic and second type of data traffic based on the allocation of the mapping elements, determining that at least one of the voice traffic, first type of data traffic and second type of data traffic exceeds a corresponding threshold value, balancing the allocation of the first, second and thirds sets of mapping elements by selectively moving boundaries therebetween on the map based on the determining and processing the voice traffic, the first data traffic and the second data traffic based on the balancing.

In another aspect of the invention, the system comprises means for generating a map having mapping elements organized in rows corresponding to the buses and columns corresponding to the baseband units, means for allocating a first set of mapping elements to voice traffic, allocating a second set of mapping elements to a first type of data traffic, allocating a third set of mapping elements to a second type of data traffic, means for processing the voice traffic, first type of data traffic and second type of data traffic based on the allocation of the mapping elements, means for determining that at least one of the voice traffic, first type of data traffic and the second type of data traffic exceeds a corresponding threshold value, means for balancing the allocation of the first, second and thirds sets of mapping elements by selectively moving boundaries therebetween on the map based on the determining and means for processing the voice traffic, the first type of data traffic and the second type of data traffic based on the altering.

In another aspect of the invention, the balancing is based on bit load, voice call equivalence and call quanta weight.

In another aspect of the invention, the balancing is dynamic.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 1 illustrates an allocation of resources for a BTS;

FIG. 2 is a table illustrating at least one aspect of the present invention;

FIG. 3 is a table illustrating at least one aspect of the present invention;

FIG. 4 is a table illustrating at least one aspect of the present invention;

FIG. 5 is a table illustrating at least one aspect of the present invention;

FIG. 6 is a table illustrating at least one aspect of the present invention;

FIG. 7 is a table illustrating at least one aspect of the present invention;

FIG. 8 is a table illustrating at least one aspect of the present invention;

DETAILED DESCRIPTION OF THE PREFERRED EMBODIMENTS

Figure 9:
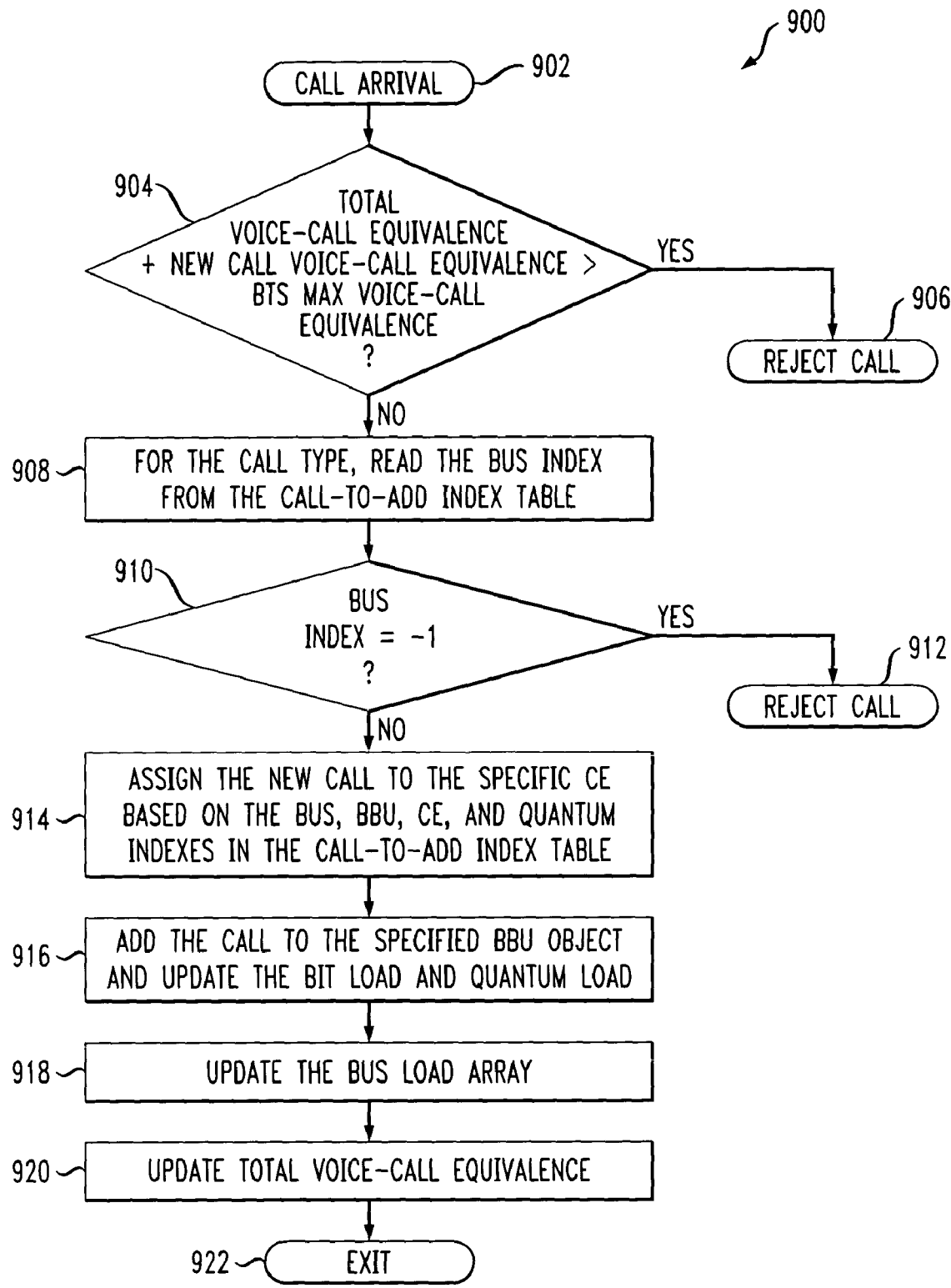
FIG. 9 is a flow chart illustrating a method according to the present invention.
Figure 10:
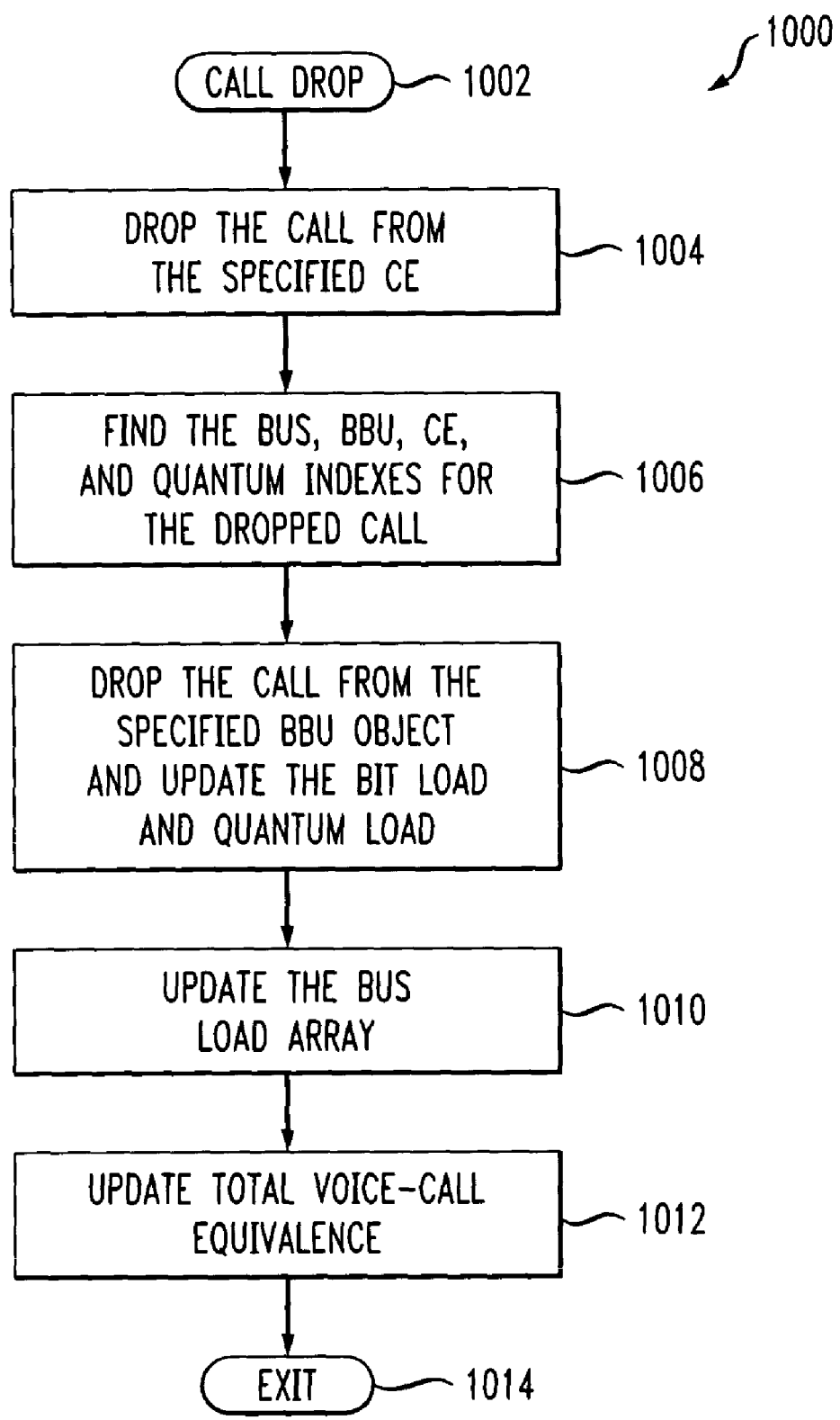
FIG. 10 is a flow chart illustrating a method according to the present invention.
Figure 11:
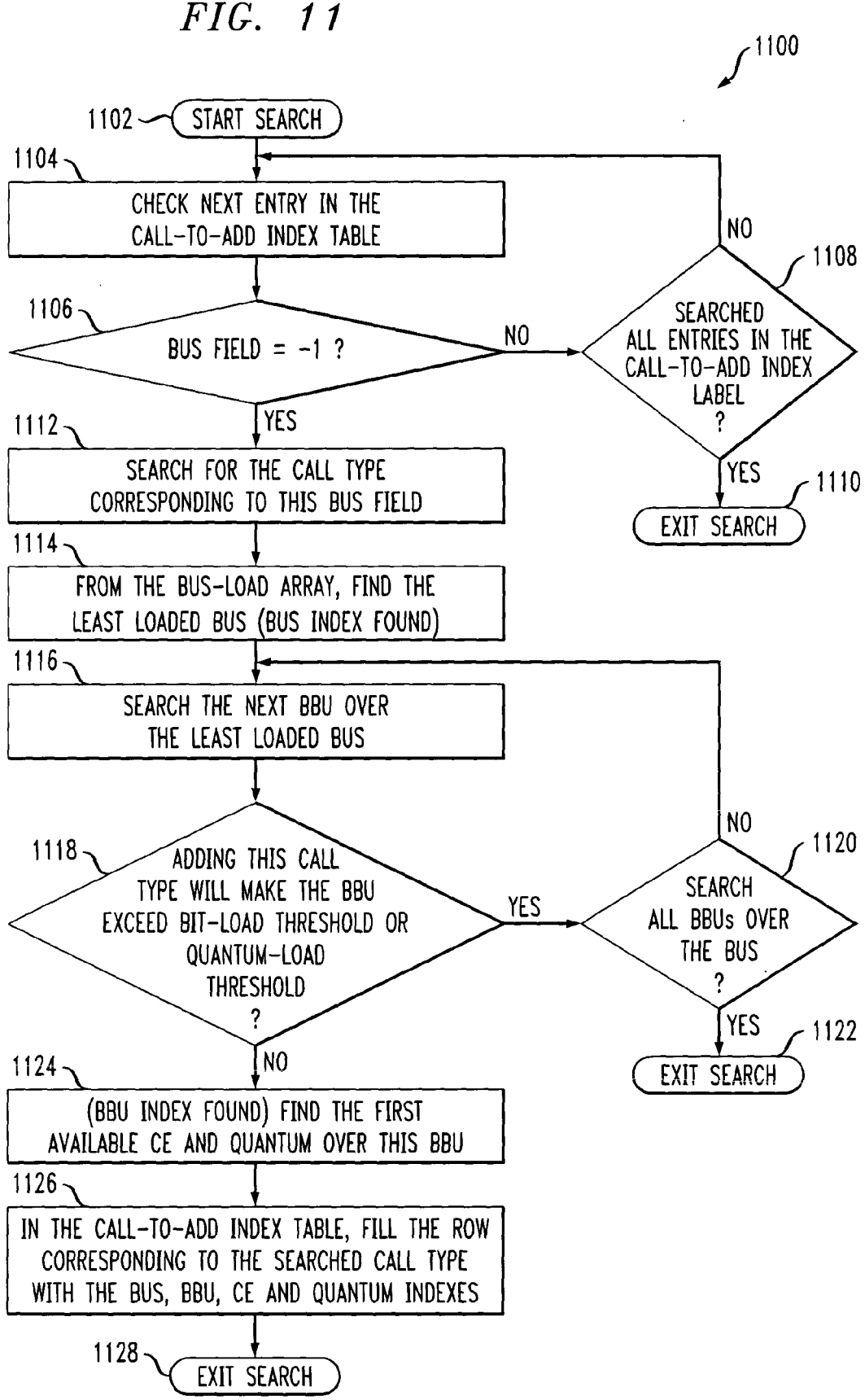
FIG. 11 is a flow chart illustrating a method according to the present invention.
Figure 12:
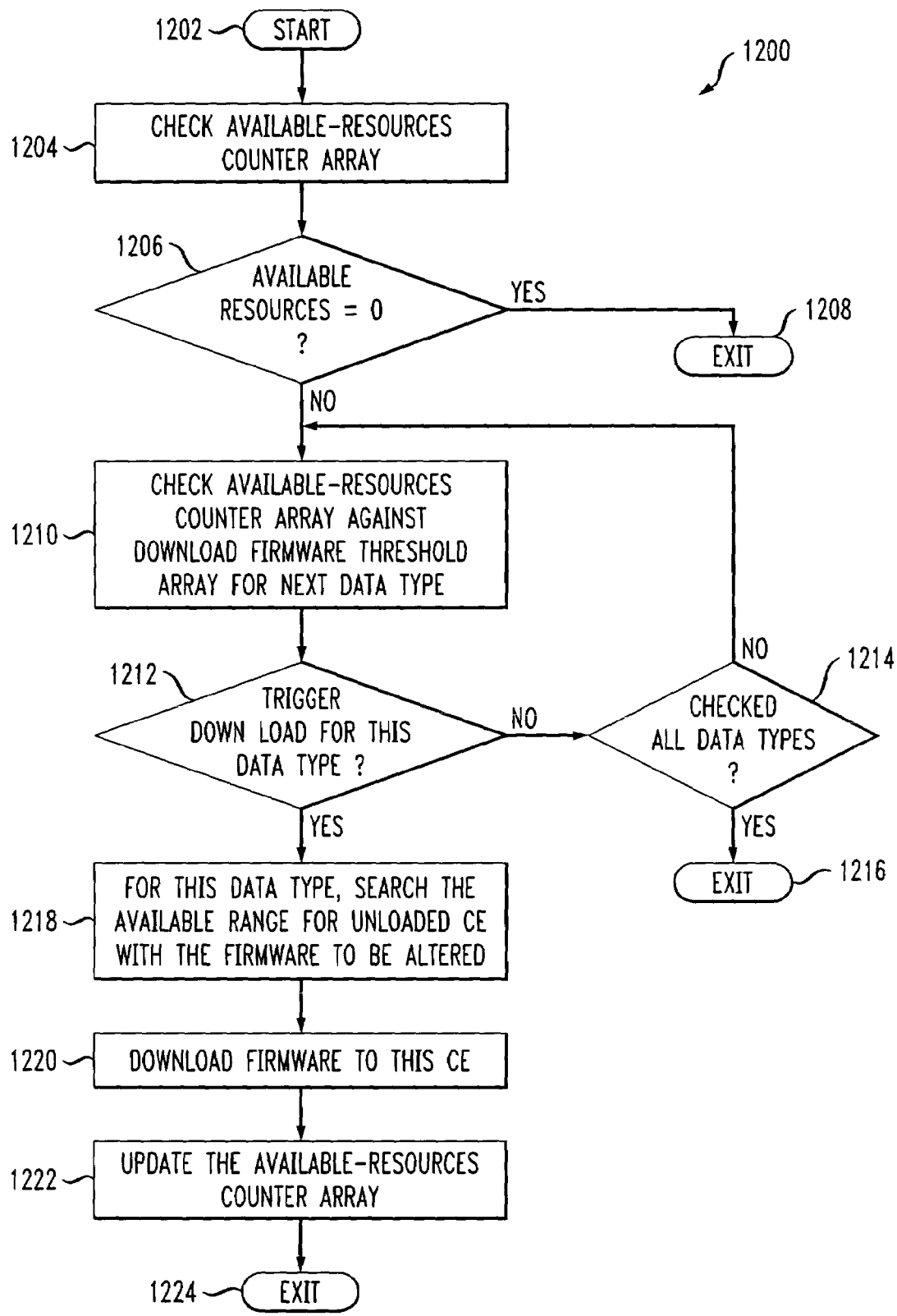
FIG. 12 is a flow chart illustrating a method according to the present invention; and, FIG. 13 illustrates an exemplary architecture to which the present invention may be applied.

Prior to providing a detailed description of the invention, it will be useful to recite objectives and advantages of the present invention. As such, in accordance with the present invention, a Channel Element (CE) allocation method and system for a 3G BTS has the following objectives:

Maximize the utilization of the available resources: If a call request is received, the system will accept the request as long as resources within the BTS are available for this call (provided that the voice call equivalence of the entire BTS, or NodeB, does not exceed the maximum allowed voice call equivalent by a large margin). This can maximize the revenues customers can make from the BTS.

True resource sharing (all resources could be available for all types of calls): The system manages the download of firmware into CEs. The system will be able to anticipate if some firmware (of inactive CEs) needs to be updated to a different firmware type based on the current load of the BTS. This anticipation is based on the current load of the BTS and call arrival rate. This allows a deployed BTS to configure itself dynamically based on its load distribution.

Balance the load over data buses: If one data bus is excessively loaded more than the rest of the buses, the delay over this bus will increase. This can affect the QoS in terms of the total allowable delay or jitter. This is specially needed when the BTS load approaches the maximum capacity. Bus-load balance is accomplished by considering the least loaded data bus first, and dynamically monitoring each bus load.

Minimize the need for resource re-allocation: For a call type that requires more than 1 call quantum (a call quantum is a fraction of a channel element that can carry a single voice call), it is not possible to assign this call over two different BBUs. Typically, if the system receives a call that requires 2 quanta, and all the available resources are 1 quantum over BBU x and another over BBU y, we should move (reallocate) a call that requires 1 quantum from BBU x to BBU y or visa versa. This will free 2 quantum over the same BBU for a new call. The present invention attempts to minimize the likelihood of this case. If the invention decides to assign a new call to a BBU, this BBU is preferably guaranteed to have enough resources for the call.

Minimize the processing time needed between call request and call acceptance: Part of the invention can be implemented as a background process that finds the next resources to be used for the call assigning process.

Allow the addition of new types for future releases: Adding new call types can be done by finding the number of call quanta needed for the new type, the actual bit load generated by the call, and the voice-call equivalence of the call.

In addition, it will be useful to have an understanding of certain terminology used herein. As such, the following definitions, while not intended to be limiting, are used in the following description of the invention:

Call quantum: The term call quantum as used herein means a unit to measure the amount of resources needed for a single voice call. In other words, a call quantum is the fraction of the CE that can carry a single voice call. For example, if a CE can carry up to 2 voice calls, a call quantum is equivalent to ½ CE. If a 64 kbps call requires 1 CE, we say it uses 2 quanta of the BTS resources. Similarly, if a 384 kbps call requires 2 CEs, we say it uses 4 quanta.

Voice call equivalence: A call has voice-call equivalence based on the ksps needed for this call (this reflects the air interface resources used by the call). For example, for the uplink direction, a voice call requires 60 ksps (i.e. 60 kilosymbols per second), a 64 kbps call requires 240 ksps, and a 384 kbps requires 960 ksps.

Bus bit-load level: Maximum aggregate traffic in kbps transmitted over a single bus.

As noted above, the invention is directed to channel element allocation based on voice call equivalence, bit load, and call quantum weight for multimedia wireless systems (e.g. 3G UMTS systems). More particularly, to handle different types of calls, various factors are taken into consideration. The specific implementation will be described in connection with the drawings.

Briefly, however, the number of call quanta needed for each call type is considered. As mentioned above, a voice call needs one quantum, a 64 kbps call needs 2 quanta, and a 384 kbps call needs 2 quanta. Also, the actual bit load that will be generated by each call type is considered. A voice call will generate a maximum of 12.2 kbps. The relationship between the number of call quanta and the generated bit load is nonlinear. In addition, the voice-call equivalence for each call type is a factor. Voice call equivalence is based on the ksps of the call type. While a voice call requires 60 ksps, a 64 kbps call requires 240 ksps, and a 384 kbps call requires a 960 ksps. The relationship between the bit rate and the ksps is nonlinear. Based on the above factors and others, the system of the present invention allocates a call to a specific CE to achieve the objectives of the invention.

In an exemplary embodiment, a system having a BTS with four (4) buses, 8 Base Band Units (BBU) per each bus, 12 CE's per BBU, and 2 call quanta per CE (i.e. a CE can carry 2 voice calls) is adapted to accommodate the present invention. This architecture is reflected in FIG. 13. The above resources give a total of 768-call quanta. Because some channels are used for control channels, the maximum number of available call quanta this demonstration uses is 672. The difference of 768−672=96 quanta=48 CE is dedicated for control channels. Thus, the present invention reserves the CEs of the last BBU over each data bus for control channels (which rules out a total of 4*12=48 CEs).

Referring now more specifically to the drawings wherein the showings are for purposes of illustrating the preferred embodiments of the invention only and not for purposes of limiting same, the system of the present invention generates a map 100, shown in FIG. 1, having mapping elements, such as the one shown at 102, corresponding to the baseband units of the buses of the system, or BTS element. The mapping elements are allocated to voice traffic (e.g. D1), a first type of data traffic (e.g. D2), a second type of data traffic (e.g. D4) and control data. Initial allocations and acceptable ranges for expansion of each of the traffic types are shown. This allows for a movable boundary between mapping elements which results in a balancing of the traffic processing on the system if one of the types of traffic has an unexpected high volume.

In this regard, the system downloads firmware into CEs as indicated by the start, or initial, ranges shown in the map of FIG. 1. For the exemplary scenario, over each bus, the following is accomplished. First, all CEs of the first 4 BBUs are loaded with voice call firmware (D1). Second, all CEs of the fifth and sixth BBUs are loaded with firmware for the first type of data traffic, or 64 kbps-calls (D2). Third, all CEs of the seventh BBUs are loaded with firmware for the second type of data traffic, or 384 kbps-calls (D4). Last, all CEs of the eighth BBUs are loaded with control-channel firmware.

With this distribution, the BTS should be able to accept up to 384 voice calls (D1), up to 96 64 kbps data calls (D2), and up to 24 384 kbps data calls (D4) without the need to alter the firmware of any CE. When call arrival of one particular type of traffic is high, the system of the present invention starts the downloading process of a firmware into some CEs. That is, the available ranges of FIG. 1 are utilized to move the boundary between the mapping elements designated for the particular types of traffic at issue.

To further illustrate and as an example, for a deployed BTS, most received calls are voice calls. If the BTS load of voice calls starts to approach the 384 calls and very few data calls are received, the system starts to download voice calls firmware into some of the CEs that carry 64 kbps firmware. This anticipation process is based on certain thresholds related to call arrival rates.

The available ranges shown in FIG. 1 allow the system to meet or exceed the maximum allowed voice-call equivalent (672 voice call equivalent in this case) regardless of the distribution of the received calls. For example, if all calls received are voice calls (no other type is received), the system will convert all the CEs (except for control CEs) to the voice call firmware as the number of voice calls increases. At the mapping level, the boundary for the mapping elements originally assigned to voice calls (or D1 traffic) is expanded to encompass all but the control mapping elements.

If all calls received are 64 kbps calls (no other type is received), the system will convert all the CEs in the fourth and seventh column to the 64 kbps firmware as the number of active calls increases. The system can accommodate up to 192 of the 64 kbps calls (the 672 voice-call equivalent is 180). FIG. 1 shows the available range of BBUs associated with each call type. Again, the boundary between mapping elements is moved based on an increase in D2 type calls.

If all calls received are 384 kbps calls (no other type is received), the system accommodates up to 48 of the 384 kbps calls (the 672 voice-call equivalent is 42). As illustrated in FIG. 1, this boundary is not movable for purposes of expanding processing for this type of data traffic; however, it could be designed to be movable depending on the objectives of the system into which the invention is incorporated.

It is to be appreciated that the preceding description is merely an example of an implementation of the invention. In this regard, the specific architecture is merely an example. The system of the present invention can be adapted to different BTS architectures.

More generally, the invention generates a map of the BTS resources, which consists of a 2-D array of BBUs (see FIG. 1). The number of rows in this array is equivalent to the number of buses (FW_num), and the number of columns in this array is equal to the number of BBUs per data bus (BBU_num). Each element of this array is a BBU object that contains a certain number of channel elements (CE_per_BBU), and each CE contains a certain number of call-quanta (Qntm_per_CE). Each BBU object also keeps track of its bit load and quantum load.

The method of the present invention is divided into the following parts: 1) Main task for call assignment and call drop out; 2) Background task for searching for the next available resources; and 3) Background task for managing firmware download.

To understand the manner in which each of these tasks, or methods, is accomplished, it will be useful to describe the tables, arrays, and counters that are available on the system to facilitate the present invention. It should be understood that the system, as described, includes software to implement the methods described herein (e.g. the methods of FIGS. 9-12) and to generate and/or maintain tables, arrays and counters. These elements are preferably disposed on the BTS element but could also reside in other locations that would achieve the objectives of the invention.

Figure 13:
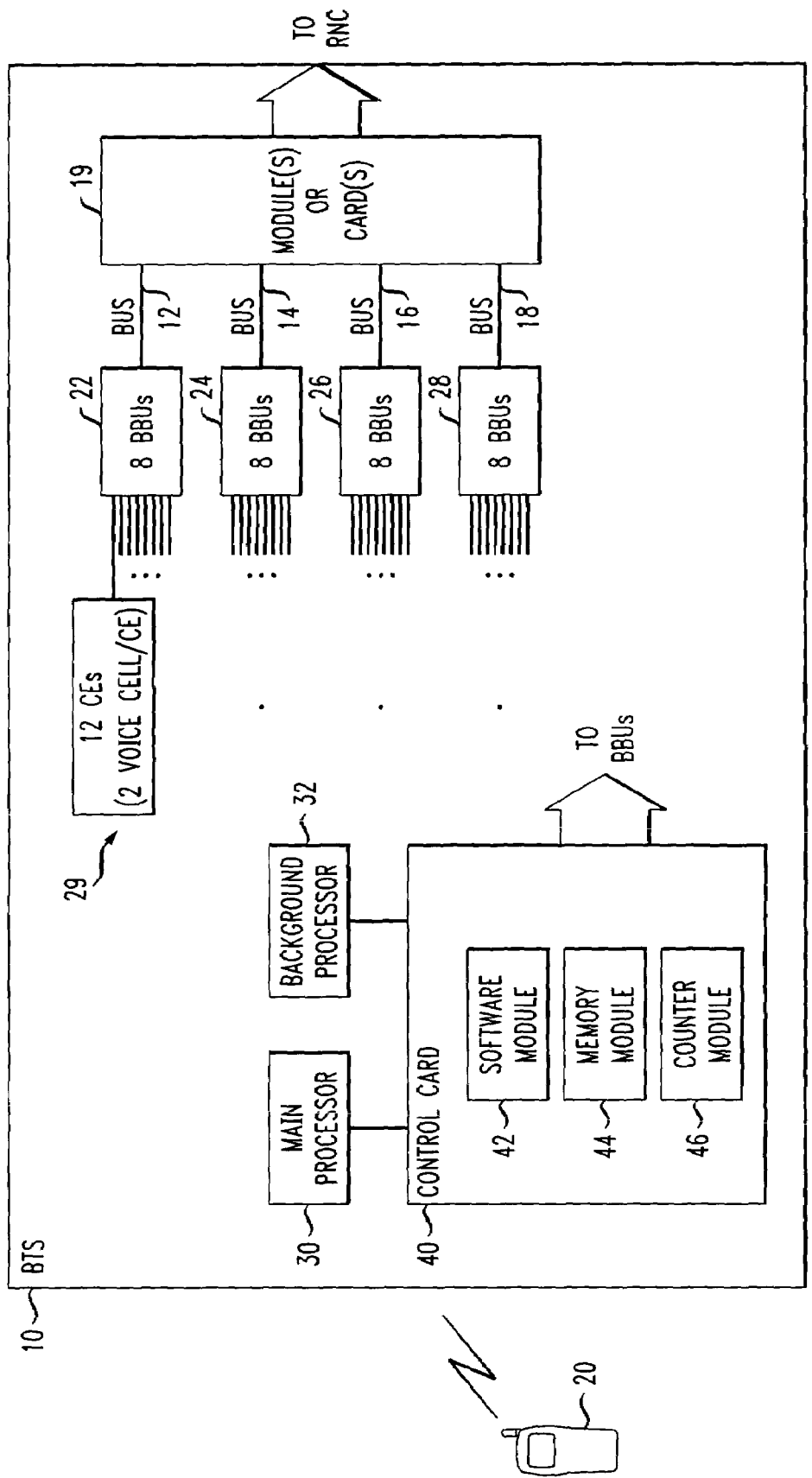

To illustrate, with reference to FIG. 13, a BTS element 10 into which the present invention is incorporated is shown. The BTS 10 communicates with a wireless user 20 through an air interface.

The BTS 10 also communicates with an RNC (not shown) by way of a module(s) or card(s) 19, which is only representatively shown for convenience and may actually comprise a number of modules or cards that perform functions known in the field. Each bus is connected with the element 19 and is also connected to a group of baseband units (BBUs). As shown, bus 12 is connected to group 22, bus 14 is connected to group 24, bus 16 is connected to group 26, and bus 18 is connected to group 28. In the illustrated embodiment, eight (8) baseband units are provided for each group. Further, each baseband unit is connected to twelve (12) channel elements 29. Only one group of twelve (12) channel elements is shown for simplicity. However, it should be appreciated that a group of twelve (12) channel elements is provided for each baseband unit, totaling 32 groups of twelve (12) channel elements for the illustrated BTS. It should be further appreciated that each channel element can carry up to two voice calls and may take a variety of forms that are known in the art, including that of a digital signal processor, or DSP.

Also shown is a control card 40 including a software module 42, a memory module 44 including appropriate tables, arrays, and other memories and a counter module 46. The card 40 communicates with each of the BBUs to implement the invention. In this way, the invention resides on both the control card and each of the BBUs. For example, the BBU control card may perform functions to accommodate the assignment or balancing of the CEs. Moreover, the card 40 is in communication with a main processor 30 and a background processor 32.

Referring to FIG. 2, a call-to-add index table 200 is provided (e.g in the memory module 44). The number of rows in this table is equal to the number of data types 202 that the BTS is expected to handle (N). The columns correspond to 4 elements. For each data type, the first column should carry a bus index 204, the second column carries a BBU index 206, the third column carries a CE index 208, and the fourth column carries the quantum index 210. Note that for a data type that occupies an entire CE, the quantum index is not used. Also, for a data type that needs more than a single CE, the CE index field can be replaced by an array.

The background task responsible for searching for the next available resource makes sure that the call-to-add index table is full. That is, the task finds the next available resources (by searching the BBUs in the direction shown in FIG. 1), and puts the indexes of the found resources in call-to-add index table. When a call arrives, the main task just assigns the call to the indexes in the call-to-add index table. Thus, an arriving call is assigned to the proper CE in minimal time.

Referring to FIG. 3, a bus-load array is provided. This 1-D array 300 contains the aggregated maximum bit load 302 over each bus 304. The number of elements in this bus is equal to the number of buses (k) in the BTS. This table is updated after each call addition and after each call drop out based on the maximum bit rate of the assigned/dropped call. The background task responsible for searching for the next available resources searches the BBUs over the data bus with the least load according to this array.

Referring to FIG. 4, a voice-call equivalence array 400 is provided. This 1-D array contains the voice call equivalent 402 of each call type 404. These values are based on the Ksps utilized by each call type.

Referring to FIG. 5, a call bit-load array 500 is provided. This 1-D array contains the maximum bit load 502 in Kbps of each call type 504.

Referring to FIG. 6, a call quantum-load array 600 is provided. This 1-D array contains the number of quanta 602 needed for each call type 604.

Referring to FIG. 7, an available-resources counter array 700 is provided. This 1-D array monitors the resources 702 available for each data call type 704 (in terms of how many call of the each type, the BTS can accommodate without the need for firmware download).

In addition, total voice-call equivalence counter is provided. This single counter counts the aggregated voice call equivalent of the entire BTS.

Moreover, a total voice-call equivalence threshold value is maintained in the system (e.g. in the memory). This threshold value is the maximum voice-call equivalent load the BTS can carry. This value is based on the air interface limit. The CE allocation algorithm will reject a call if the BTS load reaches this threshold. (Note that this feature can be disabled if needed).

A BBU bit-load threshold is also provided. This threshold is the maximum bit load a single BBU can carry.

A BBU quantum-load threshold is determined. This threshold is the maximum quantum load a single BBU can carry.

Referring now to FIG. 8, trigger download firmware threshold arrays 800 (group of arrays) are also provided. The number of 1-D threshold arrays in this group is equal to the number of calls a BTS is designed to carry. Each data type has a 1-D array that contains certain threshold values 802. These threshold values are chosen based on the arrival rate and the call duration of each call. For example, if the average voice call duration is 90 seconds, and the arrival rate is 200 voice calls per minute, the threshold value may be 300 at the D1 segment of the array. At the D2 segment of the array, this value may be 150 (if D2 needs twice as much call quantum as D1). That is, every segment of the array in FIG. 8 carries these threshold values in the corresponding metric. Comparing the available resources counter array against these thresholds will trigger the firmware download task when necessary. In other words, a firmware download process for D1 type over a baseband unit that already has D2 firmware is triggered if.

a) The values in FIG. 7 suggests that there are little resources left for D1, and there is extra available resources for D2; and b) The arrival rate of D2 is low enough to allow for relinquishing these resources without the potential for starvation for resources in the very near future.

It is important for dynamic resource allocation techniques to avoid making a decision at a given time just to reverse this decision in the near future. In this case, we cannot take resources from D2 and give them to D1, then—right after that—take some resources from D1 and give them to D2. The values in FIG. 8 are used to prevent the making of an unnecessary decision. We trigger the download process not only based on the current distribution of the resources, but also based on the expected future use of these resources.

If will be appreciated that, at startup, the system downloads firmware to the CEs according to some initial configuration. This initial configuration will dedicate certain BBUs for a certain data type. The initial configuration may be chosen based on some average or anticipated loads of the BTS. After firmware download, the system accomplishes the following:

Fill all the elements of the call-to-add index table (FIG. 2) with −1.

Fill all the elements of the bus-load array (FIG. 3) with 0.

Fill the all the elements of the available-resources array (FIG. 7) according to the initial configuration of, for example, FIG. 1.

Set the total voice-call equivalence counter to 0.

At the BBU level, the system:

Sets the bit-load counter to 0; and

Sets the call quantum counter to 0.

Referring now to FIG. 9, a flow chart for the call assignment task is illustrated. It is to be appreciated that this process is carried out by the main processor in the system (e.g. BTS). As illustrated, process 900 is initiated upon the arrival of a call at the BTS (step 902). A determination is then made as to whether the total voice call equivalence plus the new voice call equivalence is greater than the maximum capacity for the particular base station (step 904). The total voice-call equivalence counter (residing in, for example, counter module 46) and the total voice-call equivalence threshold value that is stored (in, for example, the memory module 44) are used to make this determination. If the capacity is exceeded, the call is rejected (step 906). If, however, the base station still has capacity for receiving calls, the call type is determined and the bus index of the call-to-add index table (FIG. 2) is read (step 908). If the bus index equals −1 (step 910), then the call is rejected (step 912). In most cases, however, the bus index will not equal −1 and the new call is assigned to a specific channel element based on the bus, BBU, channel element (CE), and quantum indexes in the call-to-add index table of FIG. 2 (step 914). The call is then added to the specified BBU and the bit-load and quantum-load tables (FIGS. 5 and 6) are updated (step 916). The bus-load array table (FIG. 3) is then updated (step 918). Last, the total voice-call equivalents array (FIG. 4) for the system is updated (step 920). The process then ends (step 922).

It is to be appreciated that circumstances arise which require the dropping of a call. In this regard, referring now to FIG. 10, a process 1000 that is implemented by the main processor of the BTS is illustrated. The process 1000 is initiated upon a call being dropped (step 1002). The call is dropped from the specified channel element (step 1004). The table of FIG. 2 is then accessed to determine the bus, BBU, channel element, and quantum indexes for the dropped call (step 1006). The call is then dropped from the specified BBU and the bit and quantum load tables (FIGS. 5 and 6) are updated (step 1008). The bus-load array (FIG. 3) and total voice call equivalents array (FIG. 4) are then updated (steps 1010 and 1012) before the process is ended (step 1014).

As mentioned previously, the background processor is responsible for a number of tasks according to the present invention. For example, the background processor of the BTS runs a search task every time a call is added or dropped. In this regard, referring now to FIG. 11, a process 1100 is illustrated. The process is initiated (step 1102) and the next entry in the call-to-add index table (FIG. 2) is checked (step 1104). A determination is then made as to whether the bus field is a −1 value therein (step 1106). If not, a determination is made as to whether all entries in the call-to-add index table of FIG. 2 have been searched (step 1108). If so, the search task is ended (step 1110). If not, step 1104 is repeated. If the value in the bus field is determined to be −1 at step 1106, a determination is made as to the call type corresponding to this bus field (step 1112). From the bus-load array (FIG. 3), the least loaded bus is determined (step 1114). Then, the next available BBU is determined that corresponds to the least loaded bus (step 1116). A determination is then made as to whether adding this call type will make the BBU exceed a bit-load threshold or a quantum-load threshold (step 1118). Both of these threshold values are stored in the system in an appropriate location, e.g. the memory module 44. If so, a determination is made as to whether all BBUs over that particular bus have been searched (step 1120). If so, the search task is ended (step 1122). If not, the next available BBU on the least loaded bus is determined (step 116) and step 118 is repeated. If adding the subject call to the BBU will not exceed the bit-load threshold or the quantum-load threshold, the first available channel element and quantum is determined in that particular BBU (step 1124). The call-to-add index table (FIG. 2) is then filled in accordingly (step 1126). The search task is then ended (step 1128).

The background processor also performs other tasks. For example, the background processor performs a firmware download task. This task is the implementation of the actual movement of the mapping element boundaries so that the CEs can be reassigned and balanced according to the load. In this regard, referring to FIG. 12, a method 1200 is illustrated. Once the method is initiated (step 1202), the available resources counter array (FIG. 7) is checked (step 1204). If the available resources counter equals 0 (step 1206), the download task is ended (step 1208). If, however, resources are available as determined by step 1206, the available resources counter array (FIG. 7) is checked against the download firmware threshold array (FIG. 8) for the next data type (step 1210). A determination is then made as to whether a download should be triggered for this data type (step 1212). If not, a determination is made as to whether all data types have been checked (step 1214). If so, the process is ended (step 1216). If all data types have not been checked, steps 1210 and 1212 are repeated. If it is determined at step 1212 that a download should occur, for this particular data type, the available range for unloaded channel elements with the firmware to be altered is searched (step 1218). The firmware is then downloaded (step 1220). The available resources counter array (FIG. 7) is updated (step 1222) and the task is ended (step 1224).

As should be apparent from the above description of the invention, one of the additional advantages of the present invention is that it checks the status of the BTS at various levels. The BTS level is checked. If adding the new call will cause the BTS load to exceed the maximum allowed voice-call equivalent, the call is rejected. Otherwise, there are available resources for the incoming call. The bus level is checked. To make sure that the BTS load is balanced among the data buses, the system considers the CEs over the least loaded bus first (in terms of kbps), before the second least loaded bus is considered and so on. Thus, after a call is added or a call is dropped, the present invention ranks the buses from the least loaded to the highest loaded. Last, the BBU level is a factor. When a bus is considered, the BBUs over this bus are scanned in the search direction shown in FIG. 1. Once resources are found for all call types the search process stops.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A traffic management method to manage traffic through a wireless network element having buses and baseband units for communicating to a network, the network element being operative to process at least voice traffic, a first type of data traffic and a second type of data traffic, the method comprising steps of:

generating a map having mapping elements organized in rows corresponding to the buses and columns corresponding to the baseband units;

allocating a first set of mapping elements to the voice traffic;

allocating a second set of mapping elements to the first type of data traffic;

allocating a third set of mapping elements to the second type of data traffic;

processing the voice traffic, first type of data traffic and second type of data traffic based on the allocation of the mapping elements;

determining that at least one of the voice traffic, first type of data traffic and the second type of data traffic exceeds a corresponding threshold value;

balancing the allocation of the first, second and third sets of mapping elements by selectively moving boundaries therebetween on the map based on the determining; and, processing the voice traffic, the first type of data traffic and the second type of data traffic based on the balancing.

2. The method as set forth in claim 1 wherein the balancing comprises balancing based on bit load, voice call equivalence and call quanta weight.

3. The method as set forth in claim 1 wherein the balancing is dynamic.

4. The method as set forth in claim 1 wherein the voice traffic has a voice call equivalence of 60 kilosymbols per second per call.

5. The method as set forth in claim 1 wherein the first type of data traffic has a voice call equivalence of 240 kilosymbols per second per call.

6. The method as set forth in claim 1 wherein the second type of data traffic has a voice call equivalence of 960 kilosymbols per second per call.

7. The method as set forth in claim 1 further comprising allocating a fourth set of mapping elements to control traffic.

8. The method as set forth in claim 1 wherein the network element is a base transceiver station (BTS) element.

9. The method as set forth in claim 1 wherein the network element includes four buses and eight baseband units.

10. A traffic management system operative to manage traffic through a wireless network element having buses and baseband units for communicating to a network, the network element being operative to process at least voice traffic, a first type of data traffic and a second type of data traffic, the system comprising:

means for generating a map having mapping elements organized in rows corresponding to the buses and columns corresponding to the baseband units;

means for allocating a first set of mapping elements to the voice traffic, allocating a second set of mapping elements to the first type of data traffic, allocating a third set of mapping elements to the second type of data traffic;

means for processing the voice traffic, first type of data traffic and second type of data traffic based on the allocation of the mapping elements;

means for determining that at least one of the voice traffic, the first type of data traffic and the second type of data traffic exceeds a corresponding threshold value;

means for balancing the allocation of the first, second and third sets of mapping elements by selectively moving boundaries therebetween on the map based on the determining means; and, means for processing the voice traffic, the first type of data traffic and the second type of data traffic based on the balancing means.

11. The system as set forth in claim 10 wherein the means for balancing comprises means for balancing based on bit load, voice call equivalence and call quanta weight.

12. The system as set forth in claim 1 wherein the means for balancing operates dynamically.

13. The system as set forth in claim 1 wherein the voice traffic has a voice call equivalence of 60 kilosymbols per second per call.

14. The system as set forth in claim 1 wherein the first type of data traffic has a voice call equivalence of 240 kilosymbols per second per call.

15. The system as set forth in claim 1 wherein the second type of data traffic has a voice call equivalence of 960 kilosymbols per second per call.

16. The system as set forth in claim 1 further comprising means for allocating a fourth set of mapping elements to control traffic.

17. The system as set forth in claim 1 wherein the network element is a base transceiver station (BTS) element.

18. The system as set forth in claim 1 wherein the network element includes four buses and eight baseband units.

* * * * *